United States Patent [19]

Mangelsdorf

[11] 3,758,214
[45] Sept. 11, 1973

[54] METHOD AND APPARATUS FOR THE AUTOMATIC MEASUREMENT OF DISTANCES SUCH AS LINE WIDTH OR EDGE DISTANCES OF SMALL OBJECTS

[75] Inventor: Dietmar Mangelsdorf, Geretsried, Germany

[73] Assignee: Siemens Aktiengesellschaft, Berlin and Munich, Germany

[22] Filed: Nov. 24, 1971

[21] Appl. No.: 201,696

[30] Foreign Application Priority Data
Dec. 1, 1970  Germany.................. P 20 59 106.4

[52] U.S. Cl.................. 356/160, 356/170, 356/167, 250/219 S, 250/219 LG
[51] Int. Cl. ........................................ G01b 11/04
[58] Field of Search.................... 356/160, 170, 156, 356/159, 167, 164; 250/219 S, 219 LG

[56] References Cited
UNITED STATES PATENTS
3,224,322  12/1965  Westbrook.......................... 356/167
3,218,389  11/1965  Reed............................... 356/156 X
2,674,915  4/1954  Anderson............................ 356/160
3,222,979  12/1965  Webster............................. 356/160

*Primary Examiner*—Ronald L. Wibert
*Assistant Examiner*—Paul K. Godwin
*Attorney*—Carlton Hill, J. Arthur Gross et al.

[57] ABSTRACT

A method and apparatus for automatic measurement of distances such as line width or edge dimensions of small objects, utilizing an optical system, for example a microscope, in which the resulting image is transferred to the photo-sensitive layer of a vidicon tube of a television camera and dissected thereby into picture lines for evaluation, in which the number of predetermined pulses suitably produced during the scanning from one end to the other of a calibrated distance, and the number of pulses so produced during the scanning of a distance to be measured are respectively counted and the quotient of the pulse totals so obtained is multiplied by a factor derived from the optical and electrical constants involved in the respective optical and electrical systems utilized.

10 Claims, 9 Drawing Figures

3,758,214

METHOD AND APPARATUS FOR THE AUTOMATIC MEASUREMENT OF DISTANCES SUCH AS LINE WIDTH OR EDGE DISTANCES OF SMALL OBJECTS

BACKGROUND OF THE INVENTION

The invention relates to a method for the automatic measurement of an object which is reproduced in an optical system, preferably in the intermediate picture plane of a measuring microscope, in which the image of the object involved is transferred or focussed on the photo-sensitive layer of a vidicon tube of a television camera and dissected thereby into scanning lines having individual bright and dark points, with the scanning signals so produced being conducted to a suitable evaluation logic, preferably a suitable calculator which provides the desired measurement values.

The relatively exact measurement of lengths, widths or distances, in particular of substantially two dimensional members, is preferably effected with the use of a suitable optical system such as a measuring microscope. The distance which is to be determined may be measured in the intermediate picture plane of such a microscope with the help of eyepiece micrometers or other cooperable elements such as graduated indexes or plates, etc. For example, a suitable reticle may be provided accompanied by a suitable scale or other graduated structure which are superimposed or otherwise visually applied to the image of the object. This type of measurement procedure is awkward, time consuming and its accuracy depends to a great extent on the ability of the personnel performing the measurement. In such type of operation the measurements are manually recorded. A direct supply of the measurement results, for example, into a data processing device, as is often desirable for a rationalization thereof, is not possible with such procedures.

It is also known to electronically scan the object to be measured, utilizing an optical system such as a microscope and a television camera or the like, with the successive scanning signals which are produced, in accordance with the bright and dark points of the object image being conducted to a suitable logic evaluator which supplies the final results. Such logic evaluator may, for example, comprise a counter and a calculator, with the latter supplying the final result. However, as is well known, the usual industrial television devices commercially available possess a relatively poor linearity and stability of the opto-electrical picture transformation whereby, a maximum measurement tolerance in the final result of approximately 1 percent cannot be achieved.

For very exact measurements such as the measurement of line widths in semiconductor technology or thick or thin film-wiring techniques, the known methods cannot provide the desired results.

BRIEF SUMMARY OF THE INVENTION

Preceeding from a method for automatic measurement of an image which preferably is displayed in the intermediate picture plane of a measurement microscope or the like, and in which the object image is reproduced on the photo-sensitive layer of a vidicon tube of a television camera and thereby dissected into respective scanned picture lines with individual bright and dark portions with the results being supplied to a logic evaluator, preferably a calculator, which provides the desired measurement values, the present invention has as its problem the development of a method and apparatus which will enable measurements with great exactness, for example, of conductor widths in printed patterns or print originals as they exist in fine-etching or wiring techniques.

Such problem is solved in accordance with the method of the present invention by the utilization of a predetermined calibrated distance of known dimension, which may be delineated by suitable demarcation markers which are suitably superimposed or focussed on the object image and the latter, together with such calibrated distance simultaneously scanned in the vidicon tube. Impulses from a suitable impulse generator or the like may be counted, for example, during the scanning of the calibrated distance in a first counter and impulses produced during the scanning of the object image may be counted in a second counter with the quotient of the two counting totals being suitably formed, for example, in a calculator, and such quotient then being multiplied, again, for example, in such calculator by a factor derived from the optical and electrical constants involved in the optical and electrical system, to produce the desired measurement value.

It will be appreciated that the method of the invention eliminates the effects of relative bad linearity and instabilities in the opto-electrical picture transformation. Heretofore, if a maximum tolerance in the desired measurements were to be less than 1 percent in the operational range of the vidicon tube, the scanning speed and generator frequency as well as the optical image constant would have to be subject to tolerances on the order of $10^{-4}$ and would have to be constant for a relatively long period. The requirements for stability over a long period of time, in particular with respect to the electronically produced magnitudes involved in the scanning speed and generator frequency, cannot be obtained with a sufficient exactness in present devices or if possible would involve very great expense. The television devices in use today are subject to considerably greater drifts and fluctuations, in particular in the deflection system, which is the final decisive factor involved in the speed of scanning the object image.

By means of the present invention employing reference markers defining a calibrated distance, with the geometrically-defined reference markers are modulated onto the video signal whereby such markers represent the beginning and end points of the scanning range which is to be evaluated. Such markers, identifying the calibrated distance, are uniformly illuminated, preferably by means of an auxiliary light source, which may include light-conducting fibers. Thus, the calibrated distance will be demarcated by clear identifiable marking signals.

The impulse rates over the calibrated distance and over the object image may be formed in conventional manner as the present invention does not require an absolute nor relative exactness in the impulse frequency or the scanning speed, as possible drift fluctuations and the like are cancelled by the relative formation. It is merely required that the magnitudes be constant within sufficient tolerances over a time interval of the scanning of one line i.e. between the two markers defining the calibrated distance. In the relatively short time interval involved of less than 40 $\mu$ second, this requirement can be readily achieved. In this arrangement the counting values are initially derived in digital form whereby they can be directly supplied to a data-processing device for further evaluation. The calibration factor as well as the image constant may be readily derived and once obtained may be fed into the calculator as constants.

In accordance with one feature of the invention, the auxiliary device for automatically effecting the measurement of an object image in a measurement field of an optical system, preferably in the intermediate picture plane of a microscope, such device may comprise a frame-like structure which carries thereon the marking means indicating the respective end points of the calibration path, which markers may be suitable light-conducting fibers, illuminated by a common auxiliary light source. In this arrangement the internal lateral dimension or width of the frame is greater than the largest distance which is to be measured whereby, the latter may be viewed through the frame structure and the object image along with the image of the markers focussed on the vidicon tube for simultaneous scanning thereof.

In another preferred embodiment of the invention the structure defining the calibrated distance may be remotely disposed with respect to the object which is to be measured and an image of the calibrated distance, as defined by suitable markers, brought to a focus on the photo-sensitive layer of the vidicon tube by an additional optical system in conjunction with suitable means, such as a partially reflective mirror which may be suitably positioned with respect to both optical systems whereby one image is transmitted through the mirror structure to the vidicon tube while the other image is reflected by the mirror structure onto the video tube with both images thus being superimposed on the photo-sensitive layer of the tube.

Also, if desired, calibrated distances and associated demarcation markers may be provided in orthogonal coordinate directions whereby, an object may be measured with respect to both width and height, for example by reversing the deflection system of the camera to scan in the other coordinate direction.

BRIEF DESCRIPTION OF THE DRAWINGS

In the drawings wherein like reference characters indicate like or corresponding parts.

DETAILED DESCRIPTION OF THE INVENTION

Figure 1:
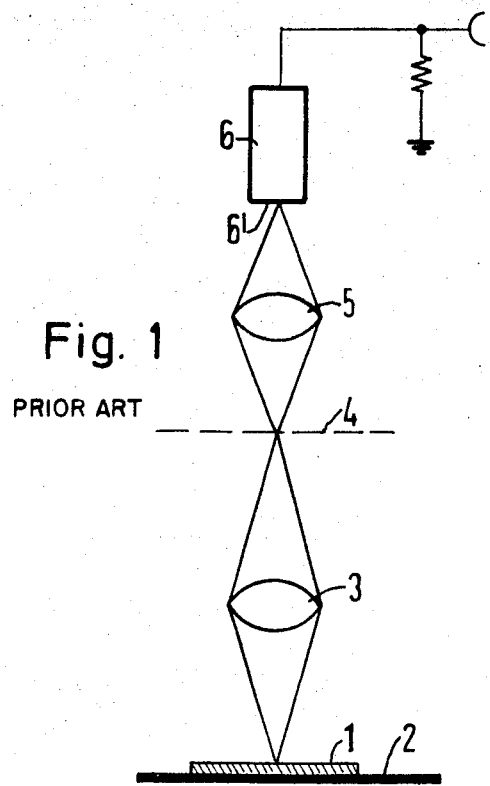
FIG. 1 schematically illustrates a measuring device employing an optical system and a vidicon tube in accordance with the prior art.

Referring to FIG. 1, the object 1 which, for example, may comprise a printed circuit or conductor plate having etched outlines may be disposed on a microscope table 2 and by means of a suitable lens system 3 an image of the object may be produced in the intermediate picture plane 4, which image may be reproduced on the photo-sensitive layer 6' of a vidicon tube 6 of a television camera by means of a fixed object lens system 5. Such prior art television system is operative to dissect the picture into individual lines with the amplitude of the video signal being responsive to the brightness of the object.

Figure 2:
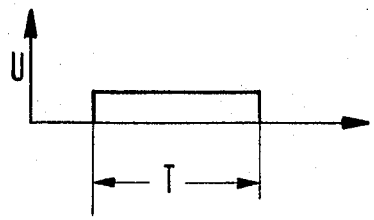
FIG. 2 diagrammatically illustrates the amplitude course of a video signal obtained in a system such as illustrated in FIG. 1.

As illustrated in FIG. 2, the amplitude of a television scanning line obtained in this manner which can be readily obtained from the television device, with the duration of the rectangular impulse T being representative of the width of the measured object, such as etched line, when the optical reproduction conditions are known. A further basic requirement for this operation is that the scanning speed v of the electron-beam dot on the vidicon surface be defined and constant. Under these circumstances a measured distance or line width G may be equated as follows:

$$G = v\ (t_2 - t_1)\ 1/V_{opt}$$

The impulse duration $T = t_2 - t_1$ may be ascertained by counting impulses produced over such time period by a frequency generator having a suitable repetition frequency $f$. In such event, the counting may start at the time $t_1$ and terminate at the time $t_2$ whereby, the number of impulses $N$ counted during such period is a digital measurement for the distance to be measured and thus may be equated as follows:

$$N = f \cdot T$$
$$G = v/f\ N\ 1/V_{opt}$$

In such equations $V_{opt}$ is the image constant, for example of the measuring microscope. In order to obtain a maximum overall relative measuring tolerance of 1 percent in the operational range of the vidicon, the scanning speed $v$, the generator frequency $f$ and the optical image constant $V_{opt}$ must be defined to be subject to tolerances of about $10^{-4}$, and constant over a relatively long period. Such requirement of a long duration stability, in particular of the electronically magnitudes $v$ and $f$ normally will not be achievable with suitable accuracy, and in any event might be acquired only at great expense.

Figure 3:
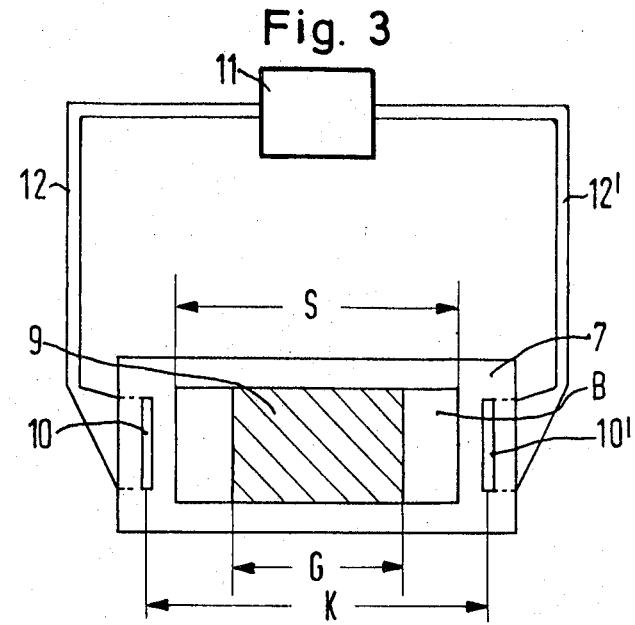
FIG. 3 illustrates one preferred embodiment of the present invention utilizing a frame structure for defining the measuring field and employing individual demarcation markers.

FIG. 3 illustrates a measurement-field aperture in accordance with the present invention by means of which the desired exactness of measurement may be achieved. In this arrangement there is provided a suitable frame 7 having a central opening which is larger in length S than the largest magnitude G to be measured. The field 9, designated by cross hatching, in the opening 8 of the frame represents the objects to be measured, the measurement being designated as the distance G. The frame 7 is provided with respective demarcation markers in the form of slots 10 and 10' which define the end limits of a calibrated distance K extending therebetween and may be illuminated, for example, by light conductive fibers 12 and 12' which are operative to conduct light from a source 11 to the respective demarcation markers 10 and 10'. The frame 7, thus may be disposed in the intermediate picture plane 4 of the optical system so that it may be focussed or reproduced on the vidicon by the lens system 5. The demarcation markers 10 and 10' thus represent the beginning and end of the operational range and define the calibration path K therebetween which is utilized in obtaining the measurement of the distance G.

Figure 4:
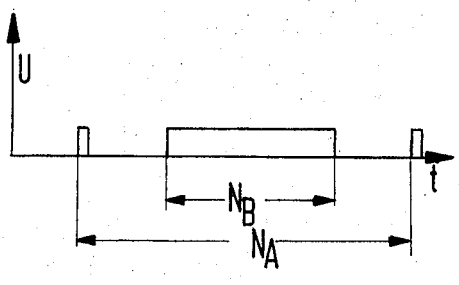
FIG. 4 diagrammatically illustrates a video signal obtained with a structure such as illustrated in FIG. 3, in the measurement of the values $N_A$ and $N_B$.

Referring to FIG. 4, the video signal, as obtained by such arrangement, is illustrated in which the distance G to be measured (FIG. 3) may be equated as follows with $N_A$ and $N_B$ representing the respective impulse totals counted, $v$ the scanning speed, $f$ the impulse frequency, $K$ the calibration factor and $V_{opt}$ the image constant:

$$G = v/f\, N_B\, 1/V_{opt} \quad \text{or}$$

$$G = N_B/N_A\, K\, 1/V_{opt} \quad \text{whereby}$$

$$K = v/f\, N_A.$$

The impulse sequences $N_A$ and $N_B$ may be counted simultaneously, for example, in respective electronic counters and it will be appreciated that neither absolute nor relative demands of exactness are required with respect to the scanning speed $v$ and the frequency generator, or with respect to the impulse frequency $f$, as such magnitudes are cancelled due to the relative formation. It is merely required that both magnitudes remain sufficiently uniform during the measurement, (duration of scanning between the reference markers) whose duration at most is 40 $\mu$ seconds. This requirement is satisfied in present industrial television devices now on the market. The counting totals $N_A$ and $N_B$ are immediately derived in digital form and thus may be directly fed into a data processing device such as a calculator for further evaluation. The calibration factor $K$ and the image constant $V_{opt}$ may be initially obtained and then programmed into the calculator as a constant.

FIG. 8a schematically illustrates, by way of example, a type of circuit which could be employed for achieving the above described operation. In the circuit illustrated the signals derived from the vidicon 6 are supplied to the inputs of respective counters 2C and 3C, the former being a two stage counter the latter a three stage. The outputs of both counters are conducted to respective inputs of a three input AND gate $A_1$ with the third input of such gate being connected to receive the same signals as appear at the inputs of the respective counters. The output of the gate $A_1$ is connected to one input of a two input AND gate, the other input being operatively connected to the output of the impulse generator Gen with the output of the gate $A_3$ being connected to a counter $N_B$. The input signals at the counters 2C and 3C are also conducted to one input of a two input AND gate $A_3$, the other input of which is connected to the output of the counter 3C with the output of the gate $A_3$ being connected to the signal input S of a flip-flop stage FF whose reset input R is likewise connected to the output of the counter 3C. The output O of the flip-flop stage FF is conducted to one input of a two input AND gate $A_4$, the other input of which is connected to the output of the impulse generator Gen. The output of the gate $A_4$ is connected to a counter $N_A$ and the outut of the two counters $N_a$ and $N_b$ are operatively connected to a calculator Calc. The reset inputs R of the respective counters may be suitably connected to be actuated by suitable signals derived from appropriate snyc signals applied to the vidicon tube.

The operation is as follows, assuming that the inputs and outputs of the respective counters 2C and 3C are of opposite polarity when the counters are in a reset condition i.e. for example, inputs negative and outputs positive, in which condition as a result of the inverter I in the output of the counter 2C negative polarity will be on two inputs of the gate A1 and positive polarity on the one input (bottom). The output of the gate A1 and thus the corresponding input of the gate A3 is negative and the gate A3 is blocked to the passage of pulses from the generator Gen to the counter $N_B$. In like manner, the signal input of the gate A3 is negative while the output of the counter 3C is positive whereby, the output of the gate A3 and thus the input S of the flip-flop FF are negative in like manner the output o of the flip-flop and thus of the associated input of the gate A4 is negative whereby, such gate is blocked to the passage of impulses from the generator Gen. Upon receipt of the first marker impulse defining the beginning of the calibration distance, the counter 2C will advance one step and the counter 3C one step, at the same time the output of the gate A3 will become positive, triggering the flip-flop stage FF with positive polarity appearing at the output thereof and at the corresponding input of the gate A4, opening the latter for the transmission of impulses from the generator to the counter $N_a$. Upon receipt of the second impulse represented by the positive flank of the pulse duration $N_b$ the second pulse is entered in the two counters with the result that a signal appears at the output of the counter 2C which is inverted and applied to the corresponding input of the gate A1. As positive polarity also appears at the common input of the gate A1 with the input of the counters 2C and 3C, positive polarity exists at all inputs of the gate A1 and thus at its output as well as the associated input of the gate A2, opening the latter to the passage of generator impulses into the counter $N_b$. At the end of the impulse $N_B$ the input of the gate A1 associated with the inputs of the gate counters 2C and 3C will return to negative polarity with the result that the output of such gate likewise reverts to its original condition blocking the gate A2 to the passage of generator impulses and thus terminating the counting operation in the counter $N_b$, counting action, however, continuing in the counter $N_a$. Upon receipt of the third marker impulse designating the end of the period $N_a$ a signal will appear at the output of the counter 3C whereby, the polarity thereat reverses, thus also reversing the polarity at the corresponding input of the gate A1 to keep the gate A2 blocked, simultaneously blocking the gate A3 and resetting the flip-flop stage FF whereby, the gate A4 is again blocked to the passage of generator impulses and thus terminating the counting operation in the counter $N_a$. The counting totals in the respective counters may then be conducted to a calculator Calc in which the desired ultimate measurement value may be obtained. Resetting of the counters 2C and 3C will take place at the beginning of the next scanning line.

Figure 8:
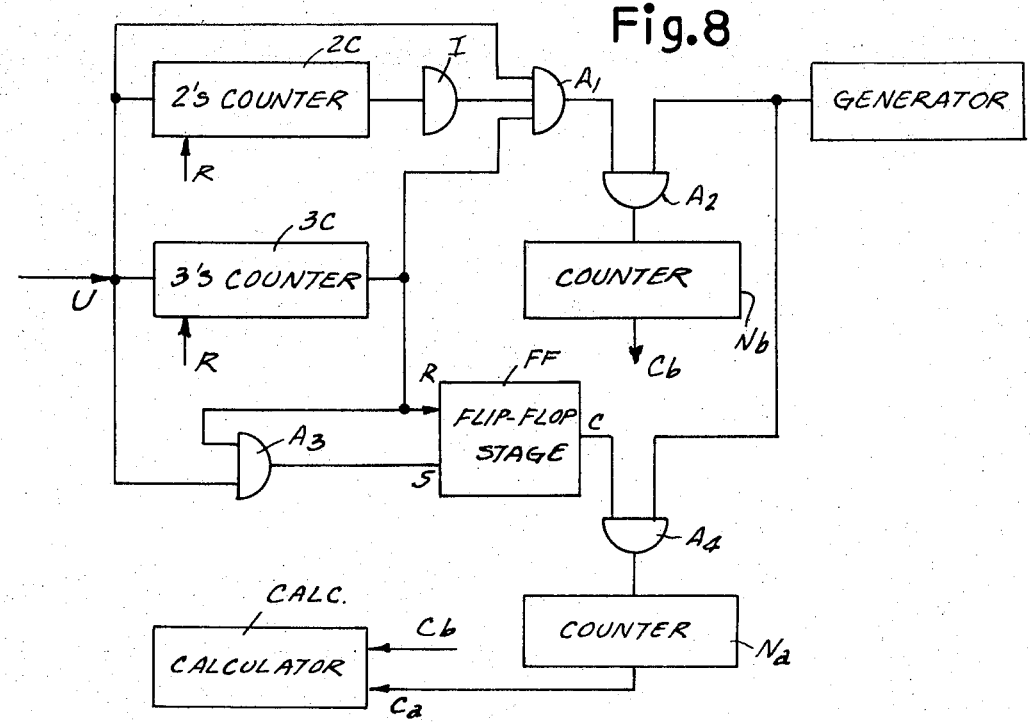
FIG. 8 is a schematic block diagram illustrating a circuit of the type which may be employed in connection with measurements as depicted in FIG. 4.

In many practical applications not only is the width of, for example, a conductor of interest but also its distance to another conductor. This measuring problem can also be solved with a structure such as that above described merely by suitable changes in the associated circuitry. An example of a type of circuit, similar to that illustrated in FIG. 8 is illustrated in FIG. 9 and involves a corresponding circuit with the addition of a third counter, several additional AND gates and one additional OR gate.

Figure 5:
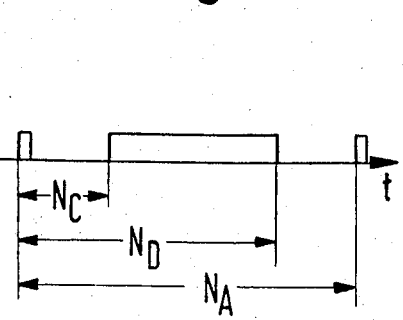
FIG. 5 is a chart similar to FIG. 4 illustrating the measurement values $N_C$ and $N_D$, in addition to the value $N_A$.
Figure 9:
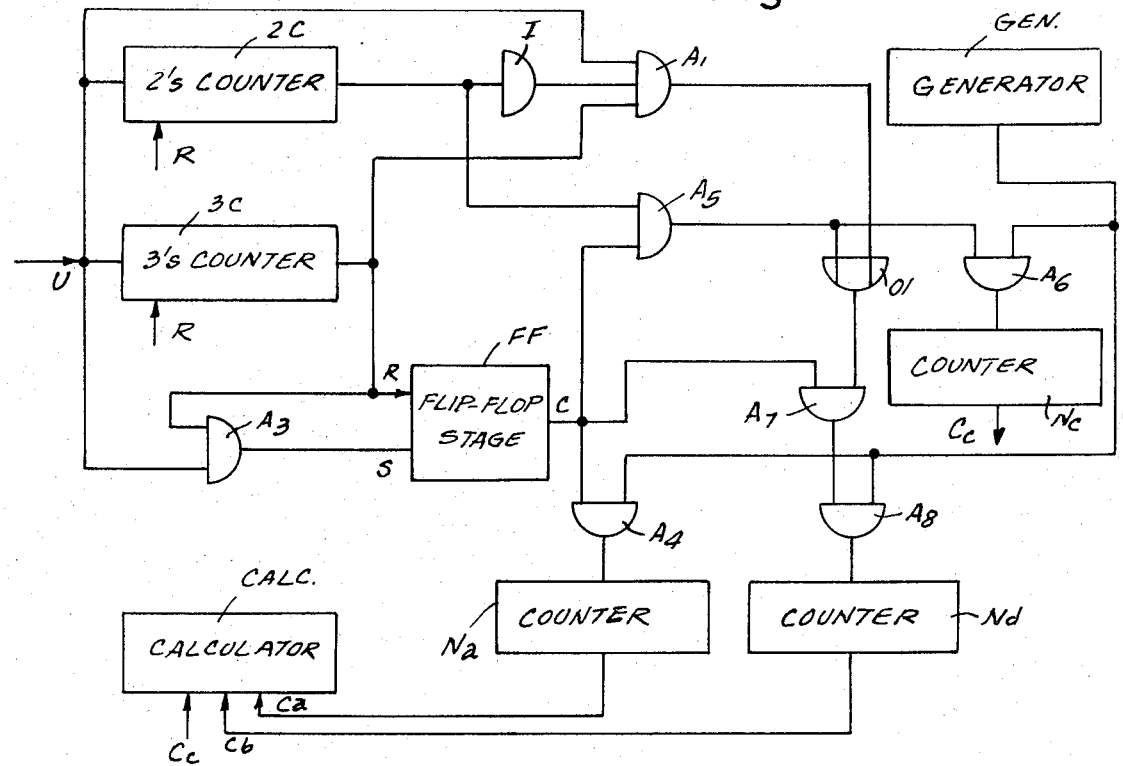
FIG. 9 is a schematic block diagram similar to FIG. 4a, illustrating a circuit of a type suitable for deriving the measurements illustrated in FIG. 5.

Referring to FIG. 9 the operation, generally corresponds to that of the circuit of FIG. 5 as to the counters 2C, 3C and flip-flop stage FF, which in a quiescent condition with the two counters and the flip-flop stage reset, gates A4, A6 and A8 are all blocked whereby, no counting pulses are passed to the respective counters $N_a$, $N_c$ and $N_d$.

Upon receipt of the first impulse, it is entered in both counters and the flip-flop stage FF flips, opening gate A4 and gate A5 which in turn opens gate A6. At the same time a signal appears at the left input of the OR gate O1 and gate A7 opens gate A8. All counters thus receive counting impulses. Upon receipt of the second impulse defining the end of the period $N_C$ counter C2 is actuated to block gate A5 resulting in blocking of gate A6 and termination of the counting operation in the counter $N_c$. At the same time, gate A8 is held open by the gate A1 which through the right input of the OR gate O1 holds gate A7 open and thus retains gate A8 open. At the end of the second impulse i.e. end point of the period $N_D$ the input of gate A1 connected with the input of counters 2C and 3C reverses polarity and as both inputs of the OR gate now have opposite polarity gate A7 is blocked and therewith gate A8 terminating the counting action in the counter $N_d$. Upon receipt of the third impulse, representing the end of the period $N_A$ the output of the counter 3C is energized resetting the flip-flop stage FF and blocking the gate A4 to terminate the counting operation in the counter $N_a$.

In some instances it is desirable to ascertain the deviation of the image with respect to the optical axis of the measuring head relative to the three counting period $N_A$, $N_C$ and $N_D$, the optical axis being defined as that intersecting the picture plane at the point ½ K. In such case, the deviation P is the deviation of the center line from the optical axis and may be expressed as follows:

$$P = [0.5 (N_D - N_c) + N_c - 0.5 N_A/N_A] K$$
$$P = [N_D + N_c - N_A/N_A] \cdot K/2$$

In order to obtain the position of the line in the measuring plane of the coordinate measuring apparatus, the deviation P is added with correct sign to the measured value.

Assuming the picture succession in the television system is synchronized at 50 hertz, only 20 milliseconds are required for the formation of an individual measurement value. Thus, several individual values may be obtained within a very short period of time whereby, the measuring instability can be essentially reduced by means of a statistical evaluation. Such evaluation may be effected in the same calculating device employed for calculating the individual values whereby, no extra expenditure is required.

Figure 6:
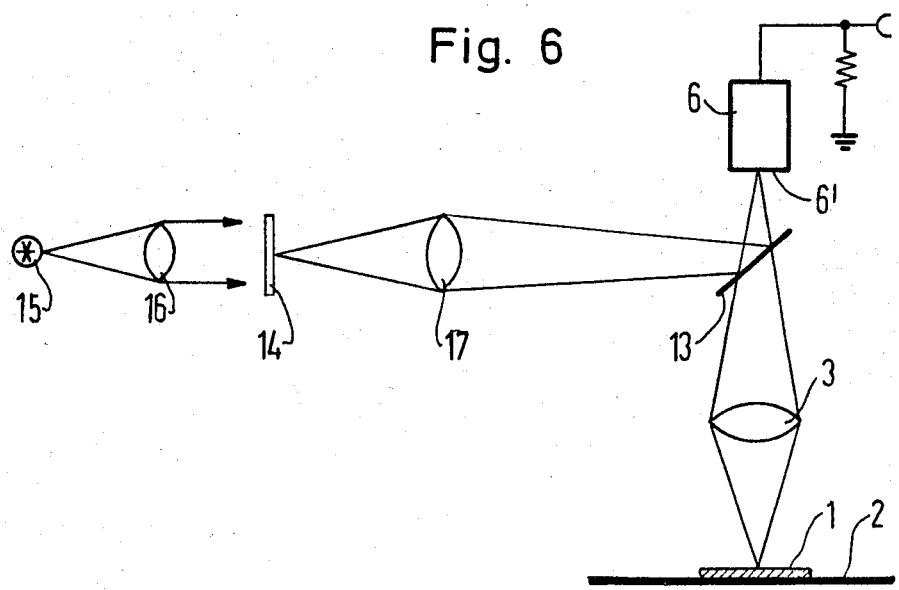
FIG. 6 is a figure, similar to FIG. 1, illustating a further preferred embodiment of the invention utilizing respective optical systems for the object image and the image of the calibrated distance, which images may be superimposed on the vidicon tube by means of a partially reflective mirror.

As previously mentioned, the structure illustrated in FIG. 3 may be disposed in the intermediate picture plane 4 of apparatus such as that illustrated in FIG. 1. However, the production of such a structure may be technically relatively expensive. A further solution to the problem is illustrated in FIG. 6 wherein the calibrated distance is suitably applied to a carrier 14 which may have, for example, slots 10 and 10' therein, which are uniformly illuminated by an illumination source 15 over a suitable optical condenser 16, the image of the carrier 14 being suitably directed by a lens system 17 to a partially reflecting mirror 13 disposed to also intersect the optical system 3 whereby, the image of the calibrated distance on the carrier 14 as defined by the markers is reflected from the surface of the mirror 13 to the photo-sensitive layer 6' of the vidicon 6, while the image of the object 1 is focussed through the mirror onto the photo-sensitive layer 6'. The object image and the image of the calibrated distance thus are simultaneously produced on the vidicon surface with an elimination of the intermediate picture plane 4 represented in FIG. 1. This arrangement thus enables a shortening of the optical length of the microscope involved and enables a simplier optical construction with respect to the image center.

Figure 7:
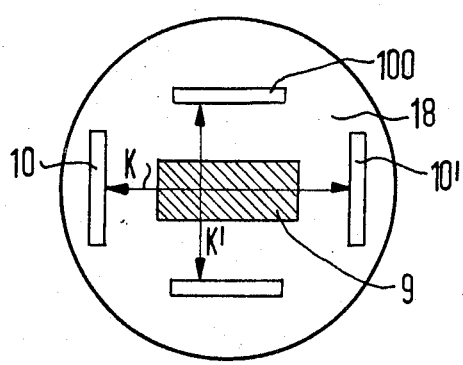
FIG. 7 schematically illustrates how demarcation markers may be arranged in coordinate directions to permit, for example, measurements of both width and height.

Referring to FIG. 7, it will also be noted that it is possible within the concept of the invention to arrange the demarcation markers in such a way that the object 9 can be scanned and measured with respect to both width and height in the field 18, utilizing a horizontal-vertical transposition in the deflection system of the television camera and providing two additional demarcation markers 100 and 100' whereby, the respective calibrated distances K and K' extend orthogonally with respect to one another.

The mirror 13 also offers a further advantage in that the mirror may be simultaneously employed to reflect light to the object 1 for illuminating the same.

Having thus described my invention it will be appreciated that various modifications may be made in the same without departing from the spirit of my invention.

I claim:

1. A method for automatic measurement of distances such as line width, or edge dimensions of small objects, utilizing an optical system, in which the resulting image is transferred to the photo-sensitive layer of a vidicon tube of a television camera and dissected thereby into picture lines for evaluation, comprising the steps of providing, with the object image, an image of a calibrated distance, producing a series of relatively uniform pulses, counting the number of pulses produced during scanning from one end to the other of said calibrated distance to form a total $N_A$, counting the number of pulses produced during the scanning of the distance to be measured to form a total $N_B$ and multiplying the quotient of the two pulse totals $N_B/N_A$ by a factor derived from the optical and electrical constants involved in the respective optical and electrical systems employed.

2. A method according to claim 1, wherein said calibrated distance is disposed in the intermediate picture plane of the optical system and images of both the calibrated distance and the object are focussed by said optical system on said photo-sensitive layer.

3. A method according to claim 1, comprising the additional step of forming an image of said calibrated distance independently of the formation of the image of said distance to be measured and focussing both images on said photo-sensitive layer.

4. An apparatus for automatic measurement of distances such as line width or edge dimensions of a small object, comprising an optical system, operable to produce an image of the distance to be measured which image is transferred to a photo-sensitive layer of a vidicon tube of a television camera operative to scan and dissect such image into picture lines for evaluation, means for producing on said photo-sensitive layer an image of a calibrated distance, means for producing relatively uniform pulses, means for counting the total number of pulses produced during scanning from one end to the other of said calibrated distance, and means for counting the total number of pulses produced during the scanning of the distance to be measured, calculating means responsive to said pulses for forming the quotient of said totals and means operable to multiply the quotient of the two pulse totals by a factor derived from the optical and electrical constant involved in the respective optical and electrical systems employed.

5. An apparatus according to claim 4, comprising space markers defining therebetween said calibrated distance, said markers being disposed in an intermediate picture plane of the optical system and thereby focussed with the distance to be measured on said photo-sensitive layer.

6. An apparatus according to claim 5, comprising a frame member defining the field of measurement in said optical system, said spaced markers being disposed on said frame, and means for illuminating said markers to provide a sharp light-contrast on said photo-sensitive layer at said markers.

7. An apparatus according to claim 6, wherein said illuminating means comprises a light source and light-conductive fibers arranged to conduct light from said source to said markers.

8. An apparatus according to claim 5, wherein two sets of markers are provided, defining calibrated distances extending orthogonally relative to each other, for use with a horizontal and vertical deflection transposition.

9. An apparatus according to claim 4, wherein said calibrated distance is remotely disposed from said optical system, said calibrated distance being defined by respective markers, an optical system for producing an image of such calibrated distance, and means for bringing such image to a focus on said photo-sensitive layer.

10. An apparatus according to claim 9, wherein said means for bringing said image to such a focus comprises a partially reflective mirror disposed to intersect both optical systems, operative to effect a focus of one of said images by reflection from said mirror and the other by passage through said mirror.

* * * * *